UNITED STATES PATENT OFFICE.

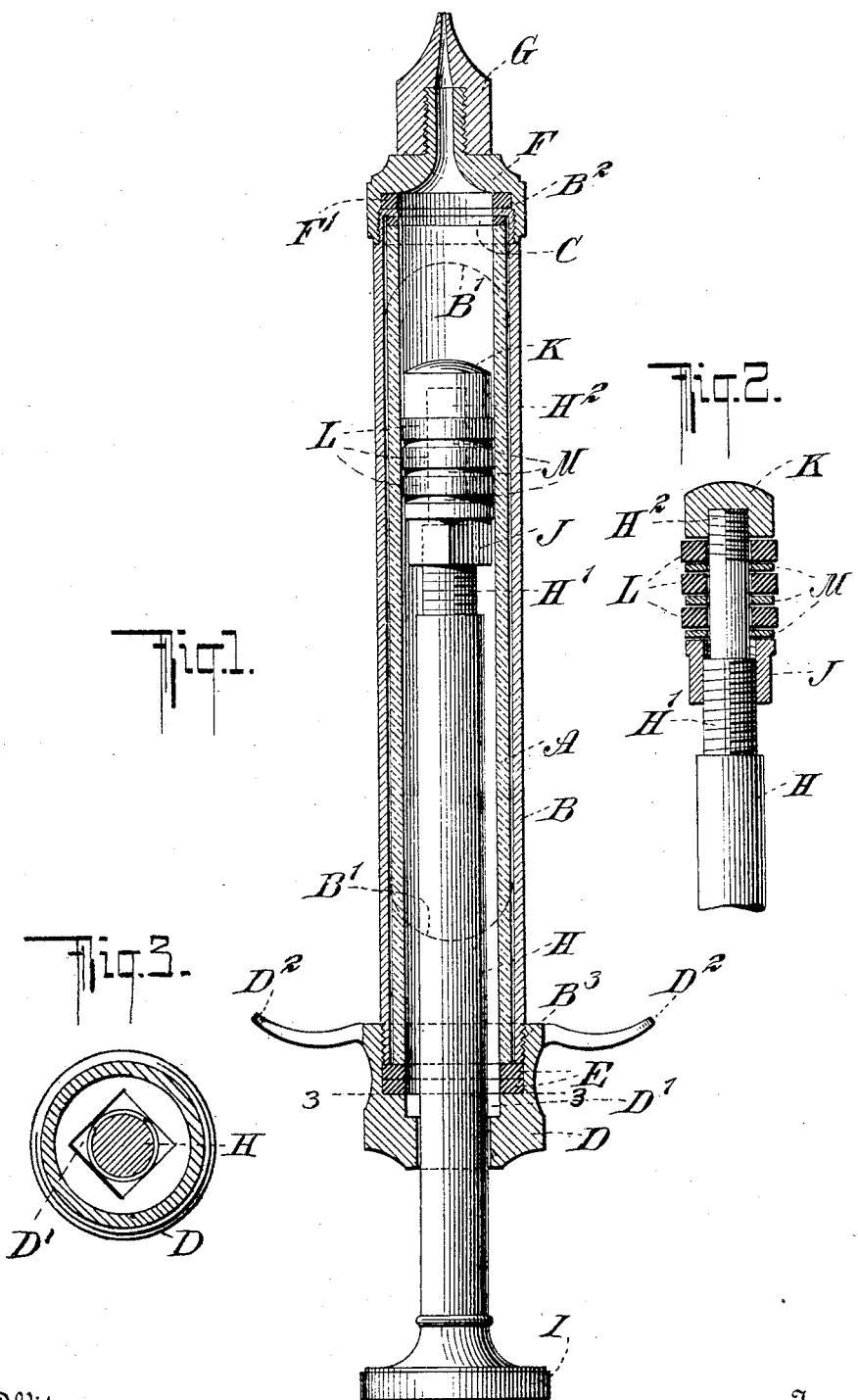

CHARLES J. TAGLIABUE, OF BROOKLYN, NEW YORK.

SYRINGE.

No. 803,640.  Specification of Letters Patent.  Patented Nov. 7, 1905.

Application filed October 6, 1904. Serial No. 227,335.

*To all whom it may concern:*

Be it known that I, CHARLES J. TAGLIABUE, a citizen of the United States, and a resident of the borough of Brooklyn, county of Kings, and State of New York, have invented certain new and useful Improvements in Syringes, of which the following is a specification.

My invention relates to syringes commonly known as "hypodermic" syringes, and has for its object to provide a piston for this class of syringes which may be expanded to fit the cylinder or barrel more or less snugly.

A specific embodiment of my invention will now be described in detail and the features of novelty pointed out in the appended claims, reference being had to the accompanying drawings, in which—

Figure 1 is a sectional view of a syringe with my invention applied thereto. Fig. 2 is a detail view of the upper part of the piston-rod with parts in section, and Fig. 3 is a sectional view on line 3 3 of Fig. 1.

A is the usual cylinder or barrel, preferably made of glass, which is secured in the tubular member B in any convenient manner, it being understood that the member B does not entirely surround the tube A, but is made with openings, as shown at B', so that the contents of the cylinder may be seen. As illustrated, the member B is provided at the discharge end with an inwardly-projecting flange $B^2$ to hold a washer C, against which one end of the cylinder A abuts. At its other end the member B is provided with a screw-threaded portion $B^3$. A nut or cap D, provided with a recess D', is arranged to be screwed upon said member B to hold the cylinder A in place, washers E being interposed between the lower end of the cylinder A and the nut D. The said nut D is provided with finger-pieces $D^2$ to permit the syringe to be more easily operated. The member B is also screw-threaded adjacent to the flange $B^2$ to receive a nut or cap F, a washer F' being inserted between the nut F and the outer surface of the flange $B^2$. The said nut F is provided with a reduced portion or nipple, which is also screw-threaded and upon which is adapted to be screwed the ordinary hypodermic needle G. The usual piston-rod H projects through an opening in the nut D into the cylinder A and is provided at one end with a head I. The piston-rod H is provided with a reduced portion H', which is screw-threaded in one direction, and with a still further reduced portion $H^2$, which is screw-threaded in the opposite direction, as shown in Fig. 2. A nut J is arranged to be moved up and down on the portion H', and a head or enlargement K is tightly secured to the end of the portion $H^2$.

Between the nut J and the head K are arranged alternate washers L, made of leather or any suitable expansible material, and metal disks M, it being understood that both the washers L and the disks M fit the portion $H^2$ loosely. (See Fig. 2.) Assuming now that the piston fits the cylinder A loosely and it is desired to have the said piston fit snugly, all that is necessary is to screw the nut J up so as to press the washers L and the disks M together, the longitudinal compression of the said washers L expanding the same laterally, thus producing a snug fit, the opposite operation—namely, the loosening of the nut J—producing a loose fit of the piston in the cylinder. This loosening or tightening of the nut J may be brought about without taking the syringe apart—that is, by merely drawing the piston-rod downwardly until the nut J enters the angular recess D' of the nut D and then turning the head I of the rod H in either direction, as may be desired. It is to be understood that the recess D' in the nut D is just large enough to accommodate the nut J and prevent it from turning, the openings in the washers being large enough to permit the nut to pass through into the recess D'. By tightly fixing the head K to the upper end of the rod H it is impossible to entirely unscrew the parts from each other when adjusting the fit of the piston, or, in other words, there is no danger of the parts becoming entirely separated from each other during such adjustment.

Various modifications may be made without departing from the nature of my invention.

I claim as new and desire to secure by Letters Patent—

1. In a syringe, a barrel, a piston-rod movable therein and provided with a reduced portion, a nut screwed on said reduced portion, a second still further reduced portion, a head secured to said second-named reduced portion, and a series of alternately-arranged expansible and non-expansible rings surrounding the said second-named reduced portion between the nut and the head, said expansible rings being adapted to engage the inside of the barrel.

2. In a syringe, a barrel, a piston-rod movable therein and provided with a reduced portion screw-threaded in one direction, a nut screwed on said reduced portion, a second still further reduced portion screw-threaded in the opposite direction, a head screwed upon said second-named reduced portion, and a series of alternately-arranged expansible and non-expansible rings surrounding said second-named reduced portion between the said nut and the head, said expansible rings being adapted to engage the inside of the barrel.

In testimony whereof I have signed my name to this specification in the presence of two subscribing witnesses.

CHARLES J. TAGLIABUE.

Witnesses:
JOHN LOTKA,
JOHN A. KEHLENBECK.